(12) United States Patent
Xi

(10) Patent No.: US 8,281,364 B2
(45) Date of Patent: Oct. 2, 2012

(54) METHOD AND SYSTEM FOR PERFORMING SECURE LOGON INPUT ON NETWORK

(75) Inventor: Zhenxin Xi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1132 days.

(21) Appl. No.: 12/163,215

(22) Filed: Jun. 27, 2008

(65) Prior Publication Data
US 2009/0013393 A1    Jan. 8, 2009

(30) Foreign Application Priority Data

Jul. 2, 2007    (CN) .......................... 2007 1 0118222

(51) Int. Cl.
G06F 7/04 (2006.01)
H04L 9/32 (2006.01)

(52) U.S. Cl. ................ 726/2; 726/22; 726/23; 713/168; 713/182

(58) Field of Classification Search .................. 726/1–8, 726/14, 22–25; 713/168, 182, 156, 175, 713/1
See application file for complete search history.

(56) References Cited

U.S. PATENT DOCUMENTS

| | | | | |
|---|---|---|---|---|
| 6,477,648 B1 * | 11/2002 | Schell et al. | .................... | 726/22 |
| 7,765,407 B2 * | 7/2010 | Locker et al. | ................. | 713/183 |
| 8,037,306 B2 * | 10/2011 | Wei et al. | ..................... | 713/168 |
| 2001/0052069 A1 * | 12/2001 | Sekiguchi | ......................... | 713/2 |
| 2003/0208689 A1 * | 11/2003 | Garza | ............................ | 713/201 |
| 2005/0037736 A1 * | 2/2005 | Jung | .............................. | 455/411 |
| 2005/0154889 A1 * | 7/2005 | Ashley et al. | ................. | 713/171 |
| 2005/0210252 A1 * | 9/2005 | Freeman et al. | .............. | 713/171 |
| 2005/0210287 A1 * | 9/2005 | Paatero | ......................... | 713/201 |
| 2006/0085845 A1 * | 4/2006 | Davis et al. | ....................... | 726/6 |
| 2006/0179293 A1 * | 8/2006 | O'Connor et al. | ................. | 713/1 |
| 2007/0061878 A1 * | 3/2007 | Hagiu et al. | ..................... | 726/14 |
| 2008/0083019 A1 * | 4/2008 | Wang et al. | ....................... | 726/5 |
| 2009/0019528 A1 * | 1/2009 | Wei et al. | .......................... | 726/4 |

\* cited by examiner

Primary Examiner — Philip Chea
Assistant Examiner — Shanto M Abedin
(74) Attorney, Agent, or Firm — Patterson Thuente Christensen Pedersen, P.A.

(57) ABSTRACT

A trusted input technique in which switching is made between an OS environment unreliable in security and a BIOS reliable in security. Rapid switching to a secure environment, such as BIOS mode, upon request for secure input, is enabled. An OS environment of a user can be quickly resumed after the user completes the input of a cryptogram. The technique does not and will not have any influence on secure transaction architecture. The identification of a server is authenticated in a trusted secure environment, and thus it is possible to prevent such problem as "phishing" websites. The user cryptogram is present as plaintext only in a BIOS environment and server and as encrypted during intermediate transmission. Thus, it is impossible to be intercepted by any virus such as a "Trojan horse".

25 Claims, 6 Drawing Sheets

METHOD AND SYSTEM FOR PERFORMING SECURE LOGON INPUT ON NETWORK

RELATED APPLICATION

The present application claims priority to Chinese Application No. 200710118222.3 filed Jul. 2, 2007, which is incorporated herein in its entirety by reference.

FIELD OF THE INVENTION

The present invention relates to the communication field, and in particular to secure transmission of encrypted data between a computation device and a network server.

BACKGROUND OF THE INVENTION

Among all disclosed secure input technologies, many solutions utilize independent secure input environments. Some solutions, however, need to modify hardware, and this leads to an increase in cost. On the other hand, some solutions create separately a new operating system or so-called OS system environment, which itself is confronted with many issues regarding hidden security troubles.

Currently, security problems are some of the most severe problems limiting transactions over networks. The intention of virus (e.g., Trojan horse) or vicious software has been switched from destroying users' computation devices to stealing users' credential data, such as account passwords for online transactions, network games or network services and the like. The stealing of such credential data will cause terrible disaster to users, and thus the most pressing issue on network security is how to guarantee security for users' cryptograms and passwords. Some methods have been proposed to address this issue in the relevant industry. These methods each have their own advantages and drawbacks.

First type: software protection methods, such as account number anti-theft means.

Above Windows operating system, a keyboard event, from its entry via a physical keyboard until display on an interface, will undergo many processes, such as hardware interruption, kernel response, bus drive, keyboard drive, Windows message flow and so on. A hacker program can install a hook program on the path of each process, so that every keyboard event above the operating system will be recorded. This results in leakage of users' credential data.

Many existing software-based methods can handle part of such vicious software, such as well-known QQ cryptogram protector, Jiangmin cryptogram protector, etc.

Unfortunately, such a cryptogram protector above the OS system has serious defects. This type of cryptogram protector has a protection capability closely associated with the programming level of software. This type of cryptogram protector often becomes invalid when a new hacker program finds a new point for intercepting credential data. The reason is that, theoretically, such a cryptogram protector cannot justify that the used environment is trusted, and thus it cannot solve the above problem fundamentally.

For example, a current CPU from Intel provides virtual technology (VT) characteristics as hardware platform function is enhanced. The latest vicious software can, based on VT characteristics of the CPU, execute the entire OS system as one GUEST OS. Thus, this virtual machine is transparent to the entire OS system. And any keyboard event can be recorded by the vicious software, disabling any cryptogram anti-theft software running above the OS system. This may cheat a user and make he or she less sensitive, that is, the user may believe that the system is secured, while loopholes are actually present in the system.

Second type: software protection method in the form of logon with certificate file+cryptogram.

The user applies for and downloads a digital certificate which can be saved as a disk file under the OS. The user encrypts a logon system with the provided certificate and cryptogram. During transaction with an online bank, for example, any data submitted to a bank server by the user will be encrypted with the certificate. Such a digital certificate file can guarantee tighter security than the logon with "account number+cryptogram".

From the perspective of security, the method of the second type has disadvantages in that, since the digital certificate is saved as a disk file under the OS system, a virus (e.g., Trojan horse) still has an opportunity to duplicate the certificate and record the user's account number and cryptogram. Thus, the user's information is still at risk of being stolen.

Third type: protection method of using a combination of software and hardware in the form of cryptogram+USB KEY.

This type of method is an improved version of the software protection method and saves critical user information, such as a digital certificate, into a USB KEY. Every time the user wants to conduct an online transaction, he or she must first insert a USB KEY and then enter his or her cryptogram. This method provides further tightened security. So, the user can conduct online activities through this method, such as USB KEY of network version from Commercial Bank, almost without any fear. On the other hand, this method has its own drawback, that is, it requires specific hardware support and thus is inconvenient to use. Moreover, certain hardware like USB KEY has to be always taken along, and losing it will incur severe aftermath of insecurity.

Fourth type: method of providing a dedicated authentication device, such as a cryptogrammic keyboard.

This method is to provide a dedicated and independent cryptogram entry device or to modify an input/output component of a computer in such manner that the new type of input device is independent of the operating system. When the user requests authentication, the authentication can be performed through a separate channel, and thus attacks from any hacker software can be effectively avoided. This method is of high security. As an example, one of the patents from US patent pool, titled Secure Board, provides a secure system with a "secure keyboard". With such a system, the user's personal information is encrypted while being read or input from the keyboard. Further, dialing is from a modem, which belongs to the keyboard, directly to a secure host, instead of passing through any public network. Thus, the information can be prevented from being stolen. Such a secure keyboard, however, usually has a sophisticated structure and needs professional design. In addition, the secure keyboard does not overcome the problem of "keyboard listening", since such a problem cannot be prevented if a hacker installs "window keyboard recorder" on the user's computer. Although other anti-listening software can be used in protection of information security, such a scheme has the disadvantage in that it is very costly, limited to a private network, and thus is difficult to apply widely.

Now, the issue of secure input is also addressed by modifying a normal keyboard and adding an independent secure input module to the keyboard. Such a scheme requires replacement of the standard hardware device, which is hard to implement in the case that computation devices have been widely applied to all kinds of activities.

Fifth type: method of using a special secure input device.

Primarily, this method is to refine an I/O architecture of a computer system so that the environment for use input is running in a unique context to ensure security for user 25 input. For example, the patent of a TPM (Trusted Platform Module)-based secure chip can fulfill input and encryption for the overall system under a secure input unit. This method is also highly secure.

The predominant problem of this method includes modification of system architecture of the computer, addition of a new hardware unit and difficulty in generalization.

Sixth type: method of using VT technology.

The aim of this method is to provide a virtual machine and execute a different operating system on the virtual machine. Between different operating systems, the systems are insulated from each other. When the user wants to conduct online business, he or she switches the system to a dedicated operating system and then performs an online transaction. This method is also highly secure and can prevent the user's input from being stolen by any hacker or Trojan horse program.

The problem of this method is that, since the virtual machine is realized in software, the security and reliability of the virtual machine must be first guaranteed if the dedicated operating system needs to be secured. Further, above a dedicated GUEST OS, some potential problems may exist as to how to block any unknown loophole of the operating system and how to update the operating system.

Seventh type: method concerning computer system architecture.

This method engages the overall computer, from hardware to OS system, as well as an overall trusted computation environment for application programs. Examples include NGSCB from Microsoft® and LT technology from INTEL®.

This type of method relies on future technology. It aims not only to solve the minor secure input issue but also to address various issues on trusted computer. This is a huge systematic project and has not been fully implemented. So, in the near future, this method cannot serve to solve urgent security issues on network transactions.

Therefore, a solution is desirable that can solve problems mentioned above or existing in the prior art. Nowadays, BIOS and OS are disjointed in terms of security. By taking advantage of this point, the present invention provides a convenient, efficient, secure and economical solution in view of the present situation in the relevant field.

SUMMARY OF THE INVENTION

The object of the present invention is to provide a technical solution of trusted input involving switching between an OS environment reliable in security and a BIOS environment unreliable in security and thus solve problems with multiple aspects, such as convenience, efficiency, security and cost suppression.

According to an aspect of the present invention, a method for performing secure logon input on network is provided comprising the steps of:

Step 102, establishing a secure channel between a client computation device and a network server and downloading the server public key certificate of said network server;

Step 104, switching an OS operating mode of said client computation device to an OS standby mode and causing said client computation device to enter a BIOS operating mode;

Step 106, inputting user authentication information in said BIOS operating mode and then causing said client computation device to exit said BIOS operating mode and be switched back to said OS operating mode; and Step 108, verifying said user authentication information by said network server if said user authentication information is used to log onto said network server, so as to implement secure logon of said client computation device.

Further, said step of establishing a secure channel comprises the steps of:

Step 1021, initiating a client program or browser for logon on said client computation device;

Step 1022, inputting the address of said network server and opening a man-machine interaction interface or webpage;

Step 1023, establishing a connection between said client computation device and said network server and downloading the server public key of said network server to the internal memory of said client computation device;

Step 1024, displaying the man-machine interaction interface or webpage of said network server by said client program or browser for logon; and Step 1025, displaying information on said man-machine interaction interface or webpage and waiting for the input of said user authentication information.

Further, said step of switching to OS standby mode and entering BIOS operating mode comprises the steps of:

Step 1041, triggering a computation device keybutton;

Step 1042, reading said server public key certificate from the internal memory of said computation device;

Step 1043, writing said server public key certificate back to the internal memory of said computation device, or writing it in NVRAM of said computation device in the form of SMI;

Step 1044, causing the OS to enter standby mode;

Step 1045, entering the BIOS operating environment mode;

Step 1046, verifying the legality of said server public key certificate; and Step 1047, waiting for the input of said user authentication information if the certificate is legal.

Further, said step of inputting said user authentication information in BIOS operating mode and switching back to OS operating mode the comprises steps of:

Step 1061, inputting said user authentication information in BIOS operating mode;

Step 1062, encrypting said user authentication information with said server public key certificate to generate an encrypted user data packet;

Step 1063, writing said encrypted user data packet in one of the two positions of the internal memory and NVRAM; and Step 1064, triggering said computation device keybutton to recover from BIOS operating mode to OS operating mode.

Further, said step of logging onto said network server and verifying said user authentication information by said network server comprises the steps of:

Step 1081, reading said encrypted user data packet in OS operating mode;

Step 1082, logging onto said network server;

Step 1083, sending said encrypted user data packet to said network server by establishing the connection;

Step 1084, decrypting said encrypted user data packet at said network server;

Step 1085, verifying said user authentication information at said network server; and Step 1086, permitting access to said network server if the logon is legal.

Further, said establishing a connection includes establishing a connection of SSL encryption channel.

Further, said user authentication information includes a user's account number and cryptogram, ID card number, PIN, verification code of credit/debit card and dynamic code.

Further, said network is a wireless network and/or a wired network.

Further, said network includes Internet and/or a local network.

Further, said computation device includes a personal computer, graphic work station, handheld computation device and/or intelligent mobile phone.

Further, said OS includes Windows, MacOS, Linux and Unix OSs.

The switching between said BIOS operating mode and said OS operating mode is executable without system restart of said computation device.

Said computation device keybutton is unique.

According to a further aspect of the present invention, a system for performing secure logon input on a network comprises a client computation device and a network server and establishes a secure channel between said client computation device and said network server, wherein a network secure input unit, secure environment switching unit, secure environment operating unit and secure storage unit are provided on the side of said client computation device, and a secure input verification unit is provided on the side of said network server, said network secure input unit is controlled by the OS of said client computation device and adapted for communication interface of said network server;

said secure environment switching unit is triggered by a computation device keybutton and controlled by said OS, and is adapted for switching between OS operating mode and BIOS operating mode to establish a channel between said network secure input unit and said secure environment operating unit;

said secure environment operating unit is controlled and initiated by BIOS of said client computation device and adapted for reading and verifying the server public key certificate of said network server as well as inputting and encrypting user authentication information;

said secure storage unit is controlled by BIOS of said client computation device, available for read and write access, and adapted for storing the CA root certificate of said server public key certificate; and said secure input verification unit is controlled by said server and adapted for decrypting and verifying the encrypted user authentication information transmitted via logon from said network secure input unit.

Said network secure input unit is further adapted for:

initiating a client program or browser for logon on said client computation device;

inputting the address of said network server and opening a man-machine interaction interface or webpage;

establishing a connection between said client computation device and said network server and downloading the server public key of said network server to the internal memory of said client computation device;

displaying the man-machine interaction interface or webpage of said network server by said client program or browser for logon; and displaying information on said man-machine interaction interface or webpage and waiting for the input of said user authentication information.

Said secure environment switching unit is further adapted for:

reading said server public key certificate from the internal memory of said computation device by triggering the computation device keybutton;

writing said server public key certificate back to the internal memory of said computation device, or writing it in NVRAM of said computation device in the form of SMI;

causing the OS to be switched from operating mode to standby mode, and then entering a BIOS operating environment mode;

switching from BIOS operating mode back to OS operating mode by triggering said computation device keybutton; and reading the encrypted user data packet in BIOS operating mode in OS operating mode.

Said secure environment operating unit is further adapted for:

verifying legality of said server public key certificate, and waiting for the input of said user authentication information if the certificate is legal;

inputting said user authentication information in BIOS operating mode;

encrypting said user authentication information with said server public key certificate to generate an encrypted user data packet; and writing said encrypted user data packet in one of the two positions of the internal memory and NVRAM.

Said network secure input unit is further adapted for:

reading said encrypted user data packet provided by said secure environment switching unit, and sending it to said network server via the established connection.

Said secure input verification unit is further adapted for:

decrypting said encrypted user data packet; and verifying said user authentication information, and permitting access to said network server if the logon is legal.

Further, said establishing a connection includes establishing a connection of SSL encryption channel.

Further, said user authentication information includes a user's account number and cryptogram, ID card number, PIN, verification code of credit/debit card and dynamic code.

Further, said network is a wireless network and/or a wired network.

Further, said network includes Internet and/or a local network.

Further, said computation device includes a personal computer, graphic work station, handheld computation device and/or intelligent mobile phone.

Further, said OS includes Windows, MacOS, Linux and Unix OSs.

The switching between said BIOS operating mode and said OS operating mode is executable without system restart of said computation device.

Said computation device keybutton comprises one of a button icon displayed on the screen of said computation device, a system shortcut key on the keyboard of said computation device and a specific hardware button on said computation device.

With the above solutions, the present invention achieves the following effect:

There is no need for modification of any hardware device of the computation device. In other words, the present invention is applicable to any future computation system, and almost no additional hardware cost is required. Only with version updating of BIOS and reservation of some available disk space, for example, the present invention can be applied to most of existing computation devices.

Additional features and advantages of the present invention will be set forth in part in the following description, and in part will be apparent from the description, or may be learned by practice of the invention. The object and other advantages of the present invention can be achieved and obtained through structures specifically provided in the description, claims and figures.

BRIEF DESCRIPTION OF THE DRAWINGS

The figures given here are intended to provide a deeper understanding of the present invention and constitute part of the application. The exemplary embodiments and description thereof in the present invention are intended to explain the present invention rather than limit the present invention. In the figures.

DETAILED DESCRIPTION OF THE INVENTION

The principal idea of the present invention is, on the basis of a trusted secure environment operating unit, to establish a dynamic input trust chain of a secure environment operating unit→secure environment switching unit→network secure input unit→secure input verification unit at a server, so as to, with the addition of a secure storage unit for storing, protect a user's critical credential data and thus guarantee a smooth process of the overall network secure transaction.

Now, the present invention will be illustrated in detail with reference to the figures and embodiments.

Figure 1:
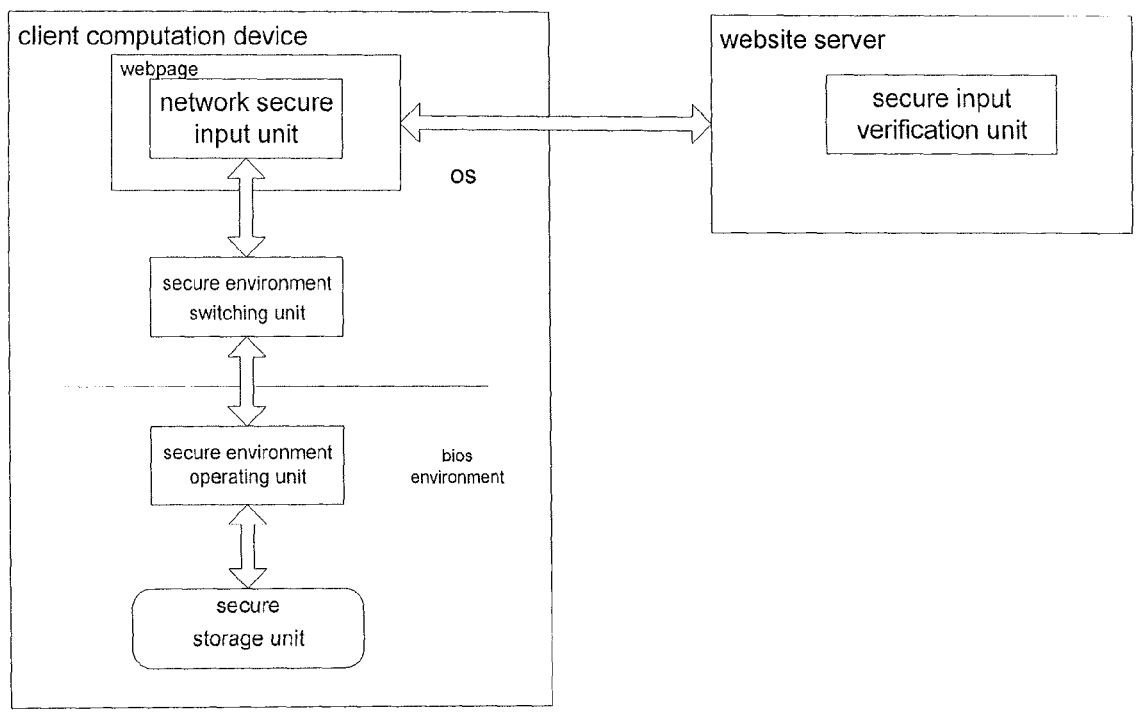
FIG. 1 shows a block diagram of units in a logic system of the present invention.
Figure 2:
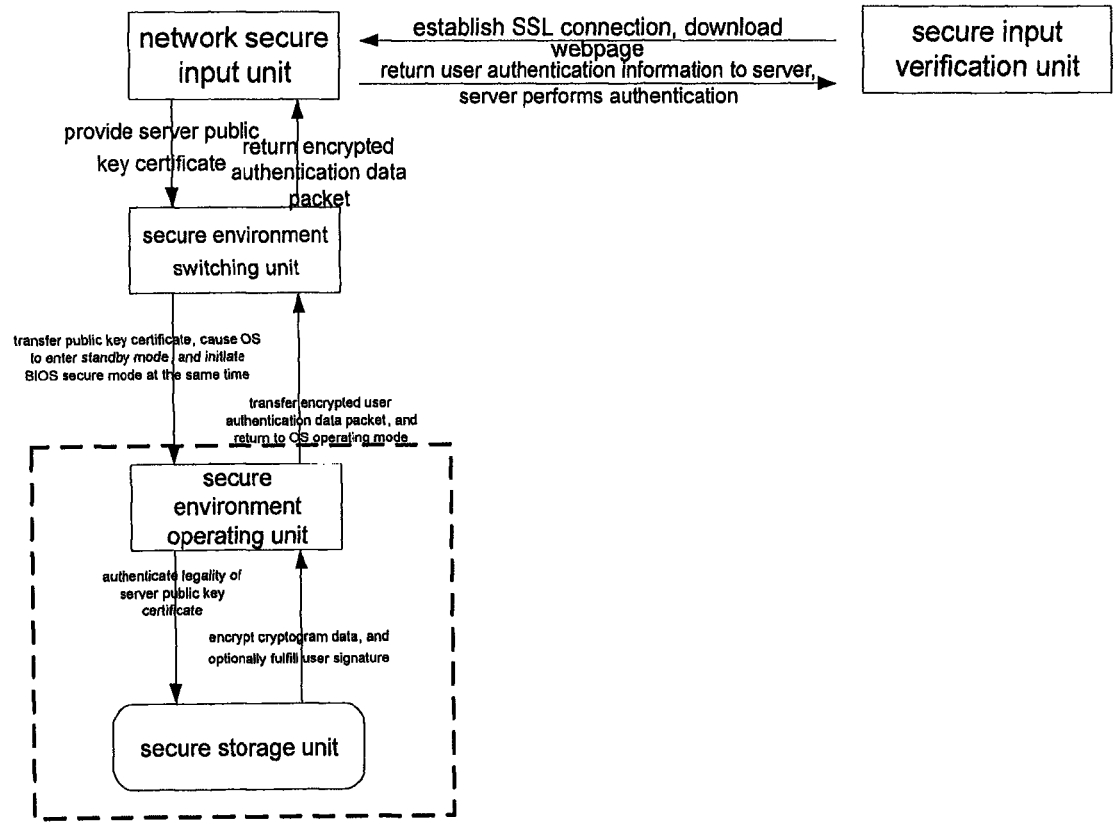
FIG. 2 shows a flowchart of a trust chain for the overall trusted secure input environment on the basis of the logic system in FIG. 1, according to an embodiment of the present invention.
Figure 3:
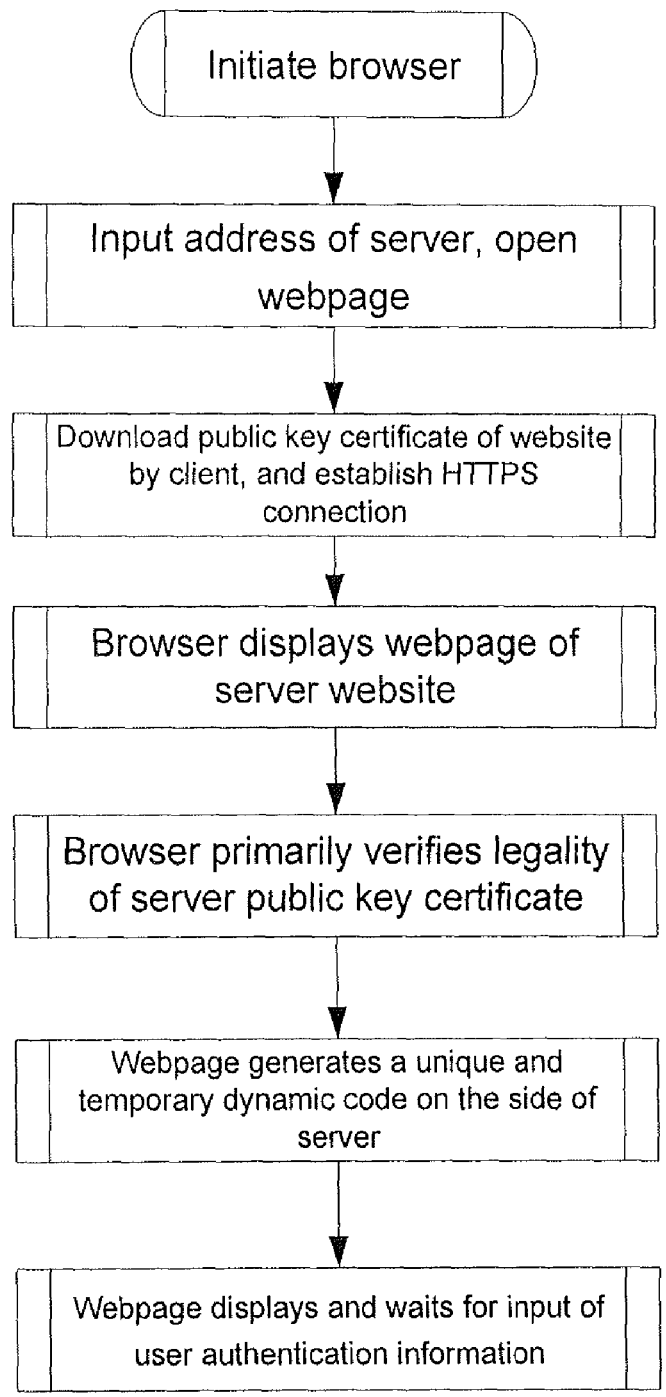
FIG. 3 shows a flowchart for establishing a secure channel between a client computation device and a network server to download a network secure input unit, according to an embodiment of the present invention.
Figure 4:
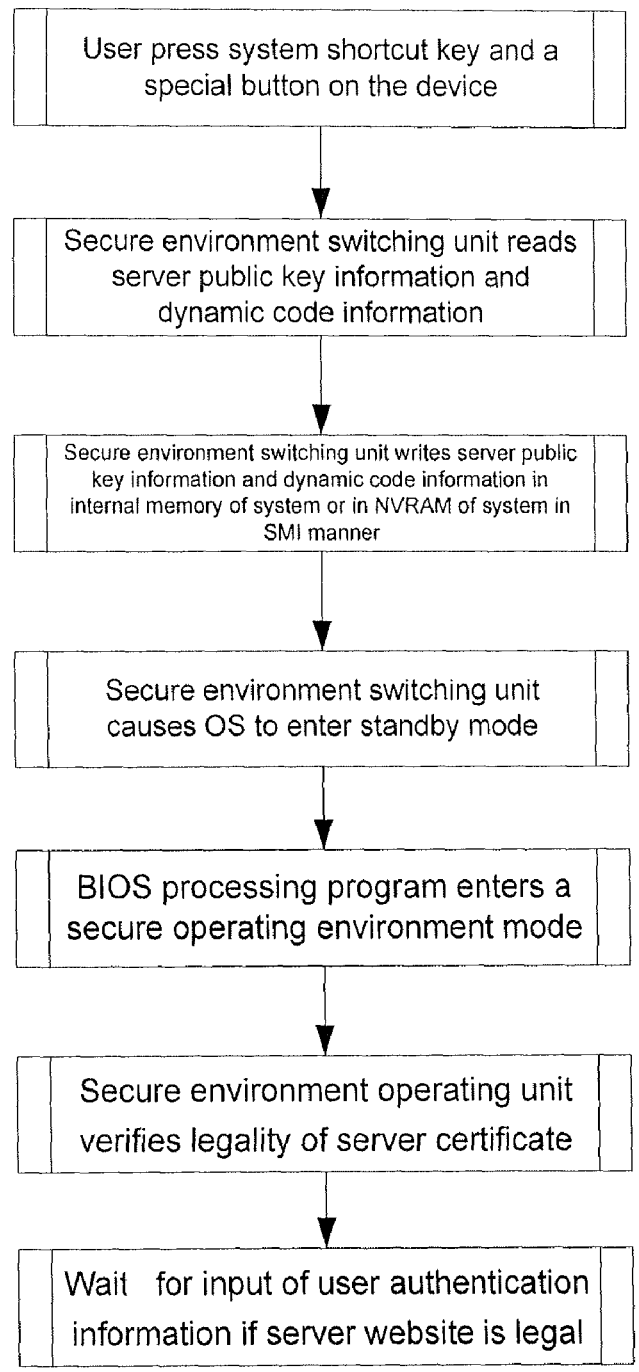
FIG. 4 shows a flowchart for explaining the flow of entering a BIOS secure operating environment, according to an embodiment of the present invention.
Figure 5:
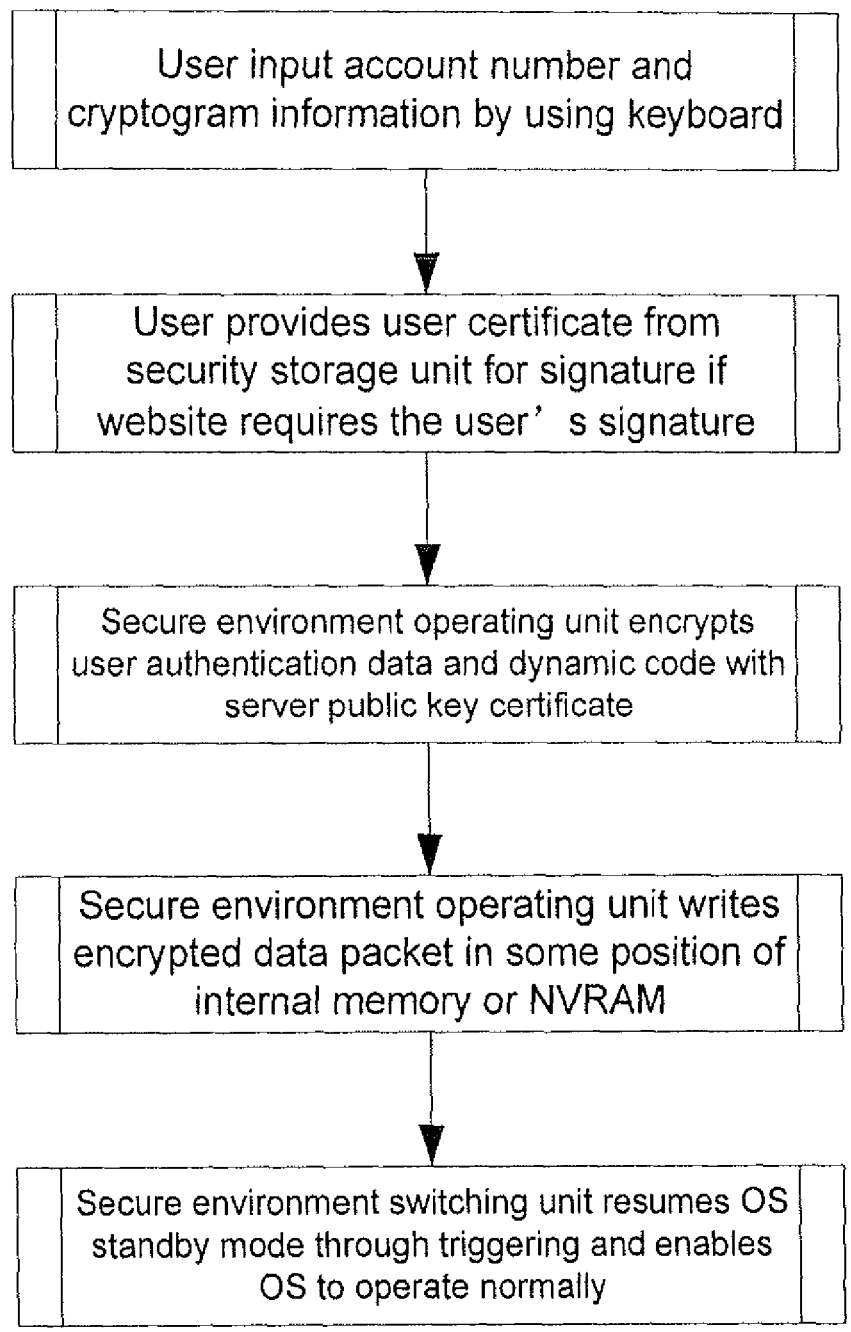
FIG. 5 shows a flowchart for explaining the flow of inputting, by a user, user authentication information in a BIOS secure operating environment and switching from BIOS mode to OS operating mode, according to an embodiment of the present invention.
Figure 6:
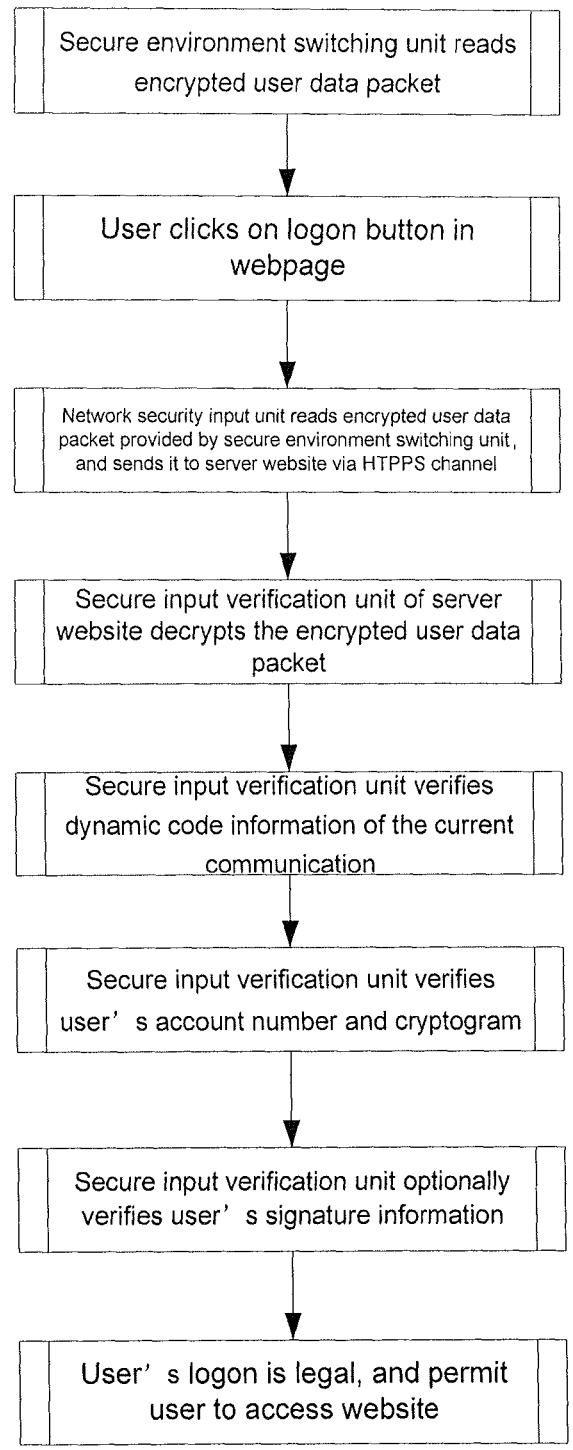
FIG. 6 shows a flowchart for explaining the flow of a user logging onto a server website and the latter verifying the legality of the user authentication information, according to an embodiment of the present invention.

First referring to FIGS. 1 and 2, in accordance with an embodiment of the present invention, 1. A network secure input unit is provided on the webpage of each website a user needs to log on. This unit can provide the public key certificate of the website indicating the legal identity of the website. Then, the unit can also receive an encrypted user data packet encrypted with the public key certificate of the website. Having received the encrypted user data packet, the website decrypts it with the private key certificate of the website and thus reads information inputted by the user, such as account number, password and certificate. This unit can be downloaded from the webpage to the user computer and initiated and executed in the form of a control.

2. A secure environment switching unit is added to the user's computer system. This unit acquires the public key certificate of the website from the network secure input unit, and writes it at some position of a RAM internal memory or writes it at some position of a nonvolatile NVRAM. Having received a shortcut key input act from the user, the unit causes the current OS to rapidly enter standby mode and BIOS to enter a secure input environment.

3. A secure environment operating unit is added in BIOS mode. First, the unit reads the public key certificate of the website written by the secure environment switching unit, and verifies reliability of the certificate. The legality of the website can be effectively determined through verification by maintaining a root certificate of a certificate authority (CA) center in a secure storage unit described later. Then, the unit prompts the user to input information on account number and cryptogram, and encrypts the information with the public key certificate of the legal website. Finally, the unit writes the encrypted user data packet encrypted again back in the internal memory of the system or saves the data packet at some position of NVRAM, and switches back to OS operating mode.

4. A secure input verification unit is added to the website server. After the user device returns to OS operating mode, the secure environment switching unit above the OS reads the encrypted user data packet and sends the encrypted data packet to the network secure input unit, which will transfer the content of this data packet to the website server after the user clicks on a logon button on the webpage. The secure input verification unit at the website server decrypts the data packet with the private key certificate of the website and verifies reliability of the user's identity.

5. A dynamic code in the format of, for example, GUID, can be added upon each operation of logon and authentication, in order to prevent the replay attack of any hacker software. This dynamic code contains information on time, website connection and the like. The dynamic code will be encrypted along with the credential data, such as the user's account number and cryptogram, by using the public key certificate of the website. In this way, the website server can effectively protect the user's credential data from any replay attack.

6. An authentication module for a user certificate can be added to the secure environment operating unit and the secure input verification unit at the website server, in order to prevent any dictionary attack on a user password. That is, the authentication of the user's identity requires provision of a more secure certificate in addition to a password. Further, access to the user certificate can be enabled only in a BIOS environment, in order to block a duplication act of any hacker software. As such, a hacker cannot obtain the user certificate and thus launch a dictionary attack on a user password.

7. A secure storage unit is added. The unit is located at BIOS level logically, while physically it can be in a Flash memory or in some area of RAM in the computation device. The secure storage unit can safely store a list of root certificates of a CA, which is used for verifying whether the public key certificate of the website accessed by the user is legal. Read and write access to the unit can be enabled only in BIOS operating mode, and thus it is possible to effectively protect the security of the list of root certificates of a CA. The center can also store the user certificate and protect it from being duplicated by any hacker software.

| Security problems | Solutions |
| --- | --- |
| Interception of cryptogram keyboard input event | Provide cryptogram input environment inside firewall (FW), no chance for invasion from any virus, such as a "Trojan horse" |
| On-OS interception of cryptogram content | Encrypt cryptogram with server public content key certificate; cryptogram has been encrypted at the end of input act; cryptogram can be decrypted by network server only when cryptogram arrives at the server |
| Tampering of input In FW secure environment | Require provision of server public key certificate before entering FW secure environment; the public key certificate will be verified in the FW environment |
| On-OS attack from phishing website | Verify the public key certificate of website above as, and notify user that the current linked website is illegal if the verification fails |
| On-OS replay attack from vicious software | Vicious software can intercept pressed cryptogram packet, and send it at the time of logon. As a countermeasure, a dynamic code is provided. A website server issues a unique dynamic code for each connection every time the OS is connected to the website for server certificate downloading. The public key certificate is used to encrypt both the message and the unique dynamic code in the FW environment. After returning to the OS environment, the encrypted cryptogram packet is sent to the server. The server checks the cryptogram and the dynamic code to ensure that the data packet is not a replayed data packet. |
| Disguise window | This type of "Trojan horse" first injects a DLL into an IE browser to monitor the web address of the current webpage, while recording keyboard events. After finding that the user inputs card number, cryptogram and submits the information, the "Trojan horse" conceals the browser rapidly and pops up its own window. The pop-up window of the "Trojan horse" appears similar to some webpage, such as an online financing web page, and has some "phishing" text, which reads that the user must re-enter the cryptogram because of system maintenance. The "Trojan horse" will send the cryptogram to its author only when the re-entered cryptogram matches that upon the initial logon. Although a "Trojan horse" disguised as a browser interface is easy to implement and immature in technology, such a virus can incur severe damage. |
| Screen "video recording" | No fear of the problem of screen "video recording", since critical password and cryptogram are inputted in the FW environment. |

Hereafter, the operation and mutual relationship of respective system units will be described according to an embodiment of the present invention and in connection to FIGS. 2 to 6.

Network Secure Input Unit:

The unit can provide a communication interface of the server website, such as a public key certificate reading interface of the server website, after downloading the webpage onto the client computer. It is possible to check whether the identity of the website is legal by verifying the public key certificate at the secure environment operating unit. And with this public key certificate, it is ensured that any data information after encryption with the certificate can be read only by the website. In the present method, the public key certificate of the server on the website is used to encrypt many types of authentication information of a user, such as user name, password, PIN, ID card number, verification code of credit/debit card and dynamic code. The network secure input unit transfers the information to the network server after receiving the user authentication information encrypted at the secure environment operating unit. The channel between the network secure input unit and the secure authentication at the website server is a SSL encryption channel so as to prevent the data from the host from being obtained by any hacker on the network.

To prevent a relay attack from any hacker software, the network server can generate a dynamic code of, for example, GUID format, every time that the network secure input unit of, for example, a bank transaction webpage has been downloaded to the user's computer. This dynamic code contains time information, information on network connection and the like. And this dynamic code will be encrypted together with credential data, such as the user's account number and cryptogram, by using the public key certificate of the website. By means of a tag of the dynamic code, the website server can block a replay attack on the user's credential data in an effective way.

Secure Environment Switching Unit:

This unit establishes a channel between the network secure inputting unit running above the OS of the client device and the secure environment operating unit running in a BIOS environment. When the user wants to enter a secure environment to input user authentication information, he or she can press a system shortcut key or a specific hardware button on the device. Alternatively, he or she can move a cursor with an input device, such as a mouse or a handwriting pen, to click on the button icon displayed on the screen of the computation device. In the case of a touch screen the user can press on the button icon displayed on the screen of the computation device directly with his or her finger or a stylus. The secure environment switching unit will read the server public key certificate of the network secure input unit and the data of the dynamic code, and then write them in the system internal memory at a certain position, or write them in the system NVRAM at a certain position in the manner of SMI.

After writing the desired information at a certain position, the secure environment switching unit invokes the standby mode of the system, puts the current OS into the standby mode and initiates a secure execution environment of BIOS. Since OS is in the standby mode, the switching of the system is performed at a very high speed, and the data of the internal memory can still remain in the internal memory without suffering from any influence. The OS can continue its fast operation upon switching back from BIOS.

The running mode of the system will be resumed after the secure environment operating unit in BIOS fulfills its task. On the other hand, the position in the internal memory or NVRAM for storing the public information, such as the server public key certificate and the data of dynamic code, has served to store the encrypted user authentication information. The secure environment switching unit can read the encrypted user information into the network secure input unit.

Secure Environment Operating Unit:

This unit operates in BIOS operating mode. Since BIOS is an environment at a level of a firewall (FW), it is possible to provide a highly secure operating environment in such a mode. After the secure environment switching unit switches the OS mode to the standby mode, and BIOS operating mode is entered, the secure environment operating unit is activated automatically and reads information on the server public key certificate and the dynamic code provided by the secure environment switching unit from the specified position of the internal memory or NVRAM.

The secure environment operating unit reads the list of root certificates of a CA authentication center, which is stored in the secure storage unit and authenticates the server public key certificate. If the public key certificate of the server accessed by the user cannot pass the authentication, it will be insecure for the user to access the website.

If the server public key certificate has passed the authentication, the secure environment operating unit will indicate to the user to input information such as account number and cryptogram and enable an encryption of the information with the public key certificate of the authenticated website. While encrypting the information, the dynamic code of the format of, for example, GUID is encrypted together to guarantee security for the user's data packet. To enhance reliability for the above authentication of the user, the encrypted data packet can be signed with a private key certificate of the user, which is stored in the secure storage unit, so as to further ensure reliability for the user authentication information.

Finally, the secure environment operating unit writes the encrypted data packet back to some position in the system internal memory or saves it at some position of NVRAM, and resumes the standby mode of OS.

Secure Storage Unit:

This unit can store the list of root certificates of a CA. And the list of root certificate is used to verify whether the public key certificate of the website accessed by the user is legal. This unit can be read and written only in BIOS mode, thereby efficiently guaranteeing security for the list of root certificates of a CA. The center can also store the user's certificate to protect the user's certificate from being duplicated by any hacker software.

Secure Input Verification Unit:

The device will return to the OS operating mode after the user finishes inputting his or her cryptogram. At this moment, the user logs on according to a logon indication from the server website. The network input unit on the webpage reads the encrypted data packet of user authentication information from the secure environment switching unit, and transfers the encrypted data packet, through a secure SSL channel, to the secure input verification unit on the network server. The secure input verification unit decrypts the user's data packet with the private key certificate of the server, obtains information on the user and verifies it by using user information in the database. The public key certificate of the user can be used to verify the user's signature (if any) so as to ensure the data packet is actually encrypted by the legal user.

As can be seen from the above description, the invention achieves the following effects.

1. A secure channel of input trust chain can be established by utilizing only the existing system architecture of a computer, without the need for any additional hardware device and cost. The present invention can take full advantage of the trusted secure environment of a firewall to complete the user's cryptogram input and verification, and thus ensure security of the overall network transaction.

2. The present invention can verify legality of a server website and thus block attacks from any "phishing" website. Thus, it can be ensured that the website for which the user is inputting a cryptogram is actually the website desired by the user.

3. The present invention provides authentication with a user certificate, and the user certificate is encrypted and saved in a separate area. An access cryptogram for the user certificate must be entered at the time of reading the user certificate. In this way, it is possible to avoid duplication of the certificate by any illegal program.

4. The network server generates a temporary dynamic code of a GUID format. This temporary dynamic code is also encrypted while the user's credential data is encrypted with the public key certificate of the website, thereby protecting the user's credential data from a replay attack.

As apparent to those skilled in the art, except that the secure input verification module is located on the side of the network server, the above-described modules or steps of the present invention can be realized with a general and/or dedicated computation device, such as an appended network server, computer graphic workstation, desktop computer, laptop computer, handheld computation device (e.g., PDA), intelligent mobile phone, etc. CPUs or central processors of these devices can be of various types. Alternatively, the modules or steps can be realized as program code executable by these computation devices. Thus, the modules and steps can be stored in a memory device and executed by the computation device. The modules or steps can be each formed as individual IC (integrated circuit) modules. Or more than one of the modules or steps can be formed as a single IC module. Further, the operating system (OS) is not limited to only Windows® from Microsoft®, MacOS®, Linux® and Unix® OSs. Client programs or browsers for logon in OS mode can be of various types, including, but not limited to, a general browser, such as Internet Explorer® (IE) from Microsoft. Other types of client programs for stock exchange logons, for example, can also be included. As such, it is not necessary to input the address of the network server or input it upon each logon. It is also unnecessary to download the network secure input unit from the network server to the user's computer upon each logon, and thus no dynamic code is required. Further, the dynamic code needs no encryption since it is public. In addition, means for triggering the switching between an OS operating environment and a BIOS operating environment can be in hardware or software, automatic or manual, input from device of hard or soft material (including human body) as well as contact or non-contact type (including remote control). The switching between OS operating environment and BIOS operating environment given in the description is only one embodiment. The switching can also be applied to any other operating environment equivalent to BIOS. Further, such switching can also to applied to the case in which multiple users and multiple tasks share a single computation device in a time division fashion. Conclusively, the present invention is not restricted to any specific combination of hardware and software. It should be appreciated that changes in the embodiments are apparent to those skilled in the art and within the scope of the present invention.

The foregoing description illustrates merely several embodiments of the present invention and has no intention of limiting the scope of the present invention. For those skilled in the art, various modifications and variations can be made to the present invention. Any change, substitution or improvement within the spirit and principle of the present invention should fall into the scope of the present invention.

What is claimed is:

1. A method for performing a secure logon input onto a network, comprising the steps of:

establishing a secure channel between a client computation device and a network server and downloading a server public key certificate of said network server;

switching an OS operating mode of said client computation device to an OS standby mode and causing said client computation device to enter BIOS operating mode;

inputting user authentication information in said BIOS operating mode and then causing said client computation device to exit said BIOS operating mode and be switched back to said OS operating mode; and verifying said user authentication information by said network server if said user authentication information is used to log onto said network server, so as to implement secure logon from said client computation device to said network server, said step of inputting said user authentication information in BIOS operating mode and switching back to OS operating mode comprises steps of—
  inputting said user authentication information in BIOS operating mode;
  encrypting said user authentication information with said server public key certificate to generate an encrypted user data packet;
  writing said encrypted user data packet in one of the two positions of the internal memory and NVRAM; and
  triggering a computation device keybutton to recover from BIOS operating mode to OS operating mode.

2. The method according to claim 1, wherein said step of establishing a secure channel comprises the steps of:
  initiating a client program or browser for logon from said client computation device;
  inputting the address of said network server and opening a man-machine interaction interface or webpage;
  establishing a connection between said client computation device and said network server and downloading the server public key certificate of said network server to an internal memory of said client computation device;
  displaying the man-machine interaction interface or webpage of said network server by said client program or browser for logon; and
  displaying information on said man-machine interaction interface or webpage and waiting for the input of said user authentication information.

3. The method according to claim 1, wherein said step of switching to OS standby mode and entering BIOS operating mode comprises the steps of:
  triggering a computation device keybutton;
  reading said server public key certificate from the internal memory of said computation device;
  writing said server public key certificate back to the internal memory of said computation device, or writing it in NVRAM of said computation device in the form of SMI;
  causing the OS to enter standby mode;
  entering the BIOS operating environment mode;
  verifying legality of said server public key certificate; and
  waiting for the input of said user authentication information if the certificate is legal.

4. The method according to claim 1, wherein said step of logging onto said network server and verifying said user authentication information by said network server comprises the steps of:
  reading said encrypted user data packet in OS operating mode;
  logging onto said network server;
  sending said encrypted user data packet to said network server by establishing a connection;
  decrypting said encrypted user data packet at said network server;
  verifying said user authentication information at said network server; and
  permitting access to said network server if the logon is legal.

5. The method according to claim 2, wherein said establishing a connection includes establishing a connection of an SSL encryption channel.

6. The method according to claim 1, wherein said user authentication information includes a user's account number and cryptogram, ID card number, PIN, verification code of credit/debit card and dynamic code.

7. The method according to claim 1, wherein said network is a wireless network, a wired network, or a combination of a wired and wireless network.

8. The method according to claim 1, wherein said network includes Internet, local network, or a combination of Internet and a local network.

9. The method according to claim 1, wherein said computation device includes a personal computer, graphic work station, handheld computation device or intelligent mobile phone.

10. The method according to claim 1, wherein said OS includes Windows, MacOS, Linux or Unix OS.

11. The method according to claim 1, wherein the switching between said BIOS operating mode and said OS operating mode is executable without system restart of said computation device.

12. The method according to claim 1, wherein said step of triggering a computation device keybutton includes one of the steps of pressing a button icon displayed on the screen of said computation device with a mouse, a touch screen input device or a handwriting pen input device, pressing a system shortcut key on the keyboard of said computation device, and pressing a specific hardware button on said computation device.

13. A system for performing secure logon input on a network, comprising a client computation device and a network server and establishing a secure channel between said client computation device and said network server, wherein a network secure input unit, secure environment switching unit, secure environment operating unit and secure storage unit are provided on the side of said client computation device, and a secure input verification unit is provided on the side of said network server,
  said network secure input unit being controlled by an OS of said client computation device and used as a communication interface to said network server;
  said secure environment switching unit being triggered by a computation device keybutton of said client computation device and controlled by said OS, and adapted to switch between OS operating mode and BIOS operating mode of said client computation device to establish a channel between said network secure input unit and said secure environment operating unit;
  said secure environment operating unit being controlled and initiated by BIOS of said client computation device and adapted to read and verify the server public key certificate of said network server as well as input and encrypt user authentication information;
  said secure storage unit being controlled by BIOS of said client computation device, available for read and write access, and adapted for storing to store the CA root certificate of said server public key certificate; and
  said secure input verification unit being controlled by said server and adapted to decrypt and verify the encrypted user authentication information transmitted via logon from said network secure input unit, wherein said secure environment switching unit is further adapted to—
  read said server pubic key certificate from the internal memory of said computation device by triggering the computation device keybutton;
  write said server public key certificate back to the internal memory of said computation device, or write it in NVRAM of said computation device in the form of SMI;
  cause OS to be switched from operating mode to standby mode, and then enter BIOS operating environment mode;

switch from BIOS operating mode back to OS operating mode by triggering said computation device keybutton; and read an encrypted user data packet in BIOS operating mode in OS operating mode.

14. The system according to claim 13, wherein said network secure input unit is further adapted to:
   initiate a client program or browser for logon from said client computation device;
   input the address of said network server and open a man-machine interaction interface or webpage;
   establish a connection between said client computation device and said network server and download the server public key of said network server to the internal memory of said client computation device;
   display the man-machine interaction interface or webpage of said network server by said client program or browser for logon;
   display information on said man-machine interaction interface or webpage; and
   wait for the input of said user authentication information.

15. The system according to claim 13, wherein said network secure input unit is further adapted to:
   read an encrypted user data packet provided by said secure environment switching unit, and sending it to said network server via the established connection.

16. The system according to claim 13, wherein said secure input verification unit is further adapted to:
   decrypt said encrypted user data packet; and
   verify said user authentication information, and permit access to said network server if the logon is legal.

17. The system according to claim 14, wherein said establishment of a connection includes establishing a connection of an SSL encryption channel.

18. The system according to claim 13, wherein said user authentication information includes a user's account number and cryptogram, ID card number, PIN, verification code of credit/debit card and dynamic code.

19. The system according to claim 13, wherein said network is a wireless network, wired network, or combination of a wireless network and a wired network.

20. The system according to claim 13, wherein said network includes Internet, local network, or a combination of Internet and a local network.

21. The system according to claim 13, wherein said computation device includes a personal computer, graphic work station, handheld computation device or intelligent mobile phone.

22. The system according to claim 13, wherein said OS includes Windows, MacOS, Linux or Unix OSs.

23. The system according to claim 13, wherein the switching between said BIOS operating mode and said OS operating mode is executable without system restart of said computation device.

24. The system according to claim 13, wherein said computation device keybutton comprises one of a button icon displayed on the screen of said computation device, a system shortcut key on the keyboard of said computation device and a specific hardware button on said computation device.

25. A system for performing secure logon input on a network, comprising a client computation device and a network server and establishing a secure channel between said client computation device and said network server, wherein a network secure input unit, secure environment switching unit, secure environment operating unit and secure storage unit are provided on the side of said client computation device, and a secure input verification unit is provided on the side of said network server,
   said network secure input unit being controlled by an OS of said client computation device and used as a communication interface to said network server;
   said secure environment switching unit being triggered by a computation device keybutton of said client computation device and controlled by said OS, and adapted to switch between OS operating mode and BIOS operating mode of said client computation device to establish a channel between said network secure input unit and said secure environment operating unit;
   said secure environment operating unit being controlled and initiated by BIOS of said client computation device and adapted to read and verify the server public key certificate of said network server as well as input and encrypt user authentication information;
   said secure storage unit being controlled by BIOS of said client computation device, available for read and write access, and adapted to store the CA root certificate of said server public key certificate; and
   said secure input verification unit being controlled by said server and adapted to decrypt and verify the encrypted user authentication information transmitted via logon from said network secure input unit; and
   wherein said secure environment operating unit is further adapted to:
   verify the legality of said server public key certificate, and waiting for the input of said user authentication information if the certificate is legal;
   input said user authentication information in BIOS operating mode;
   encrypt said user authentication information with said server public key certificate to generate an encrypted user data packet; and
   write said encrypted user data packet in one of the two positions of the internal memory and NVRAM.

* * * * *